INVENTORS: E. M. PRELL
A. F. REHERT
L. A. RIGAZIO

BY Donald M Duft
ATTORNEY

Sept. 10, 1968  E. M. PRELL ET AL  3,401,379

FALSE CODE GENERATOR

Filed Jan. 10, 1966  8 Sheets-Sheet 7

FIG. 7

Sept. 10, 1968     E. M. PRELL ET AL     3,401,379
FALSE CODE GENERATOR

Filed Jan. 10, 1966     8 Sheets-Sheet 8

United States Patent Office

3,401,379
Patented Sept. 10, 1968

3,401,379
FALSE CODE GENERATOR
Edward M. Prell, Little Silver, Allen F. Rehert, East Brunswick, and Livio A. Rigazio, West New York, N.J., assignors to Bell Telephone Laboratories, Incorporated, New York, N.Y., a corporation of New York
Filed Jan. 10, 1966, Ser. No. 519,761
10 Claims. (Cl. 340—172.5)

ABSTRACT OF THE DISCLOSURE

A register-translator is disclosed which may be selectively controlled to generate either good or bad 1-out-of-N type combinational coded output information. In its normal mode of operation, the circuit receives plural order binary data words at its input and generates a plurality of 1-out-of-N type information bits which are applied over corresponding output conductors to remotely situated data receivers. When it is desired to exercise the error detector in a data receiver, a special sequence of control signals, including the binary input data words, are applied to the circuit which, in response thereto, generates defective 1-out-of-N type output information, i.e., either 0-out-of-N or more than 1-out-of-N. The defective information is generated with the assistance of an auxiliary register which receives and stores binary information specifying the manner in which a binary word stored in a main input register is to be rendered defective when translated from binary to 1-out-of-N form.

---

Figure 1:
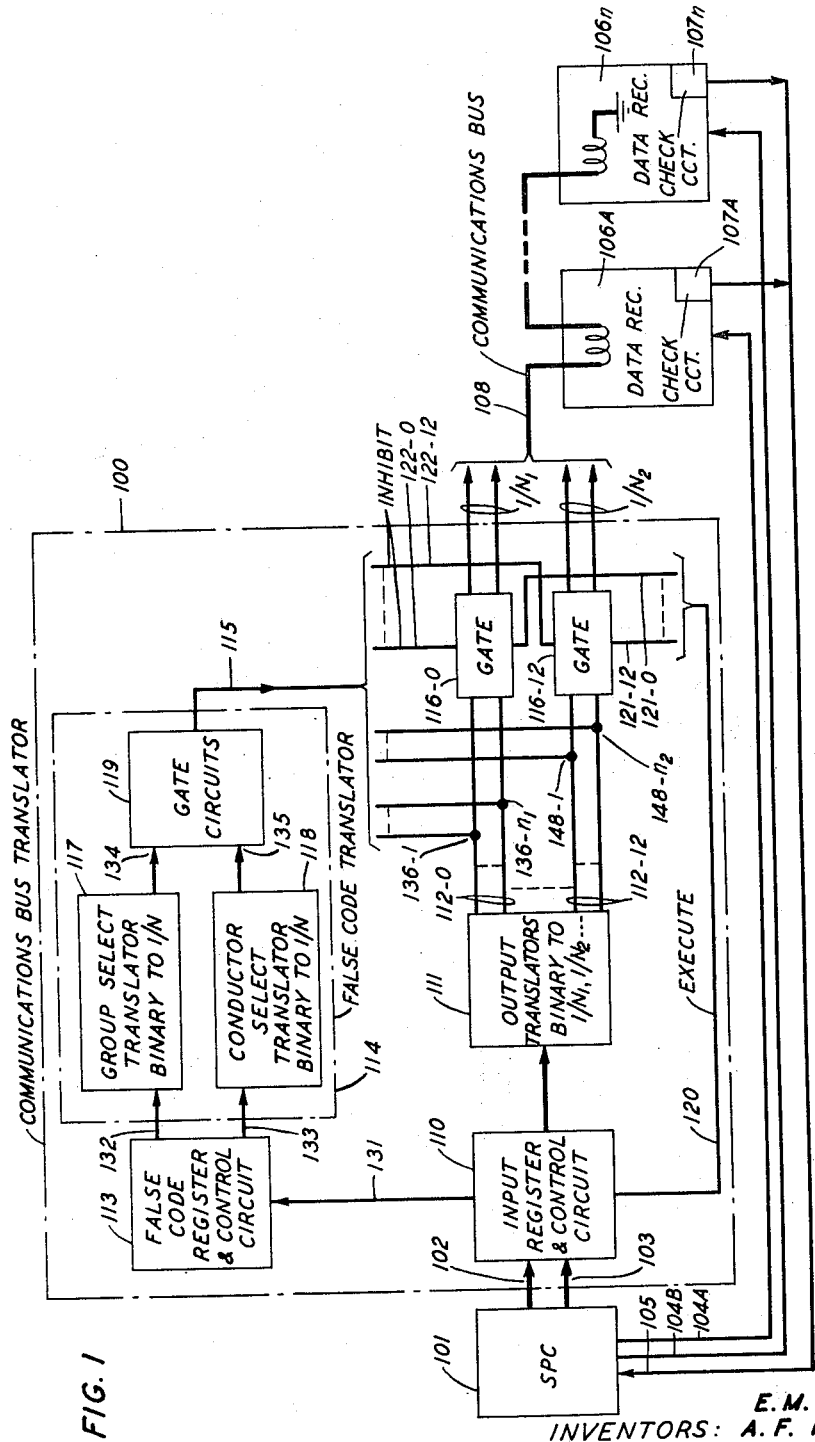

This invention relates to equipment for testing error detector circuits. More particularly, this invention relates to equipment which may generate and transmit improperly encoded information to data receivers in order to test the operational state of their error-detecting circuits. This invention still further relates to a data transmission system in which the equipment for generating the erroneously encoded information is embodied in a translator whose operation is controlled by signals received from a system controller. The translator receives binary input information from the system controller, translates the input information into combinational code form, and transmits it to the data receivers.

It is necessary in most digital transmission systems that data be transmitted and received with a minimum error rate. To this end, error-detecting arrangements of varying degrees of complexity have been developed for detecting errors in the encoding of information. For example, in systems in which data is transmitted in binary form, parity checking circuits are available for detecting errors in the coding of the received data. Circuit arrangements are also available for checking the plausibility of information transmitted in combinational code form, such as for example, 1-out-of-10, 2-out-of-5, etc.

In data transmission systems in which reliability and error-free operation are of paramount importance, the error detectors within the data receivers are arranged to return an error signal to a system controller or to the transmitting end whenever an error is detected. Appropriate corrective action may be taken upon the receipt of this signal, such as for example, a repeated transmission of the block of data containing the detected error. It is necessary that affirmative action be taken periodically to test the current operative state of the error detectors in such systems since an error signal is generated only when bad data is received. This is particularly necessary in systems having an inherent low error rate since, in these, bad information will be received only infrequently, and hence an output from the error detectors is not received with sufficient frequency to guarantee their operable state during the relatively long periods between error bits.

It is relatively simple to test error detectors in systems in which data is transmitted in binary form. All that is required in these is that the system controller command the data transmitters to send out improperly encoded information, such as for example, a word with bad parity. This causes the error detectors within the data receivers to generate an output signal indicating that they are currently operative. It is considerably more difficult to test error detectors in systems in which information is transmitted in combinational code form, such as for example, 1-out-of-2, 1-out-of-4, 1-out-of-8, etc. This type of encoding is hereinafter referred to, for convenience of discussion, as $1/N$, where "N" may comprise any integer other than "0" or "1".

The reason why it is more difficult to test error detectors in systems in which data is transmitted in $1/N$ codes may be readily explained. The control circuit in such systems often comprises a stored program machine, such as for example, a digital processor, which utilizes binary information in connection with its arithmetical and logical operations. This machine is hereinafter referred to as a "stored program controller" (SPC). The data that is to be sent to the data receivers is transmitted from the SPC in binary form to translators where it is converted into one or more $1/N$ data words which, in turn, are transmitted to remotely situated data receivers. Since binary to $1/N$ translators produce $1/N$ type data words at their output in response to any and all combinations of signals applied to their input, it is obviously impossible for the SPC to transmit a binary word which could cause the translators to generate improperly encoded output information, such as for example, $0/N$ or $2/N$. Stated another way, a binary to $1/N$ translator cannot, without more, be caused to generate implausible output information by applying any combination of binary bits to its input.

The problem of testing error detectors in $1/N$ type data receivers has been solved in prior systems in which the SPC and the binary to $1/N$ translators comprise a single circuit which sends the translated $1/N$ data to the data receivers. In these systems, a sufficient quantity of apparatus, such as binary registers and gating circuits, etc., are available within the SPC as a consequence of other functions it normally performs, so that a test of the error detectors may be accomplished by functionally placing a plurality of binary registers end-to-end so that their total bit capacity equals that of the combined output of the translators. The controller then enters into the binary registers a bit pattern which comprises implausible information in the $1/N$ code. The output of the registers is, by means of gating circuitry, shunted around the translators and applied to their outputs from where it is transmitted to the data receivers. The error detectors in the receivers are energized by the receipt of the implausible information, and they generate an error signal which is returned to the SPC as an indication that the error detectors are currently in an operative state.

The use of the foregoing described arrangement for testing $1/N$ type error detectors is limited in its application since it requires the availability of a greater number of binary registers than are available in many systems. The reason for this is that an "N" digit binary word may be translated into a maximum of $2^N$ different $1/N$ information bits. For example, a 20-bit binary word may be translated into a maximum of $2^{20}$ different $1/N$ output indications. Thus, the use of the foregoing testing expedient may require the availability of a plurality of registers whose combined bit capacity is $2^{20}$. A bit capacity of this magnitude is not normally available.

In many systems, 1/N information is transmitted to a distant data receiver by a translator which operates under control of binary signals from a remotely situated SPC. For economy of design, the translators are normally equipped with only the registration capabilities required to store the binary words normally received from the SPC. The received binary words, are registered, translated into 1/N form, and transmitted to the data receivers. The translators do not approach the complexity of stored program processors such as the SPC, and therefore they do not have available the extra registers and gating circuits required to generate implausible 1/N information in the manner described for systems wherein the SPC and the translators comprise a single circuit. Thus, without more, there is no way in which the translators are able to receive any binary words from the SPC which could cause them to generate implausible information. The cost of providing the required register and gating circuits to perform this function in the manner as accomplished heretofore would be economically prohibitive.

It is evident from the foregoing that a need exists for an improved means for generating implausible encoded information in order to test 1/N error detectors in systems in which the binary to 1/N translators are remotely situated from the system controller.

It is an object of the invention to provide improved facilities for generating implausible 1/N information for testing error detectors in data receivers.

It is a further object to provide facilities of the foregoing type in systems in which the system controller is remote from the circuit which generates the implausible coded information and transmits it to the data receivers.

In accordance with our invention, we provide, in a remotely controllable binary to 1/N type translator, facilities which permit it to generate implausibly encoded 1/N type data for transmission to data receivers. Implausible 1/N type data is hereinafter, for convenience of discussion, referred to as "false codes" and it is to be understood that the term refers to information of the 1/N type which has been improperly encoded, such as for example, by the deletion or addition of an information bit. Our translator includes an input register which stores the binary commands received from the system controller. This register has only the bit capacity required to register the commands it normally receives. We also provide in our translator a second register, hereinafter referred to as a "false code register," which has a lesser bit capacity than the input register and which is utilized only for the generation of false codes. The information stored in the false code register, when combined with that in the input register, signifies the manner by means of which defective information is to be generated.

The binary input commands stored in the input register normally drive translators which convert the binary information into a plurality of 1/N coded information bits which are gated from the translators to output circuits from where they are sent to the data receivers. The SPC effects the generation of a false code word by transmitting a series of special commands to our translator. The first command contains information signifying the manner in which good information at the translator output is to be made defective. This command is transmitted to our circuit and stored in the input register. When so stored, it comprises a binary word having a bit size equal to the bit capacity of the false code register. Subsequently, a special signal is received from the SPC which transfers the information now in the input register to the false code register. The input register is then reset and the SPC transmits to the input register a command of the same type that is normally received in connection with the generation of good 1/N data. Thus, the input register now has within it a binary command of the same type that is received during the normal operation of the circuit, while the false code register has within it information signifying the means by which the command in the input register is to be mutilated after it is translated. Specifically, the information in the false code register signifies whether a false code is to be generated by the deletion or the addition of an information bit at the output of the translator. The information in the false code register further represents which of the many output conductors of the translator is to be utilized for the transmission of the multilated information.

After the input register and the false code registers have been loaded with data of the type described, the SPC supplies an execute pulse which gates the output of the word in the input register via the 1/N translators onto the output leads. Simultaneously, the output of the false code register is gated through false code translators to the output leads in such a manner that the translated information supplied to the output leads from the input register is mutilated in the desired manner. The false code word is transmitted to the data receivers and, provided that the error detectors in there are operable, a signal is sent back directly to the SPC signifying that erroneous information has been received. Following the receipt of this signal, the SPC transmits a RESET signal to our circuit to reset both the input and the false code registers.

An improved understanding of our circuit and its advantages may be had with reference to a specific example setting forth the bit capacity of the registers and the translators. Let it be assumed that the input register has a capacity of 21 bits of the reception for SPC commands comprising 20 binary information bits plus a parity bit for a total of 21 bits. Let it further be assumed that the output conductors of our circuit are divided into groups for the purpose of transmitting a plurality of 1/N information words to the data receivers. The output conductor groups may be of various bit sizes, such as for example, 1/8, 1/4, 1/2, etc. A plurality of binary to 1/N translators are provided, each of which is individual to one of the output conductor groups. The output of each translator is connected to the conductors of its group and the input of each translator is connected on an individual basis to a plurality of orders of the input register. The number of register orders associated with each translator is dependent upon the number of conductors connected to its output. For example, a 1/8 translator would require a 3 bit binary word as input information to perform its function and it would therefore be connected to three different orders of the input register.

Let it further be assumed that the false code register has a capacity of 6 binary bits and that the output conductors are subdivided into a modest number of groups, such as for example, 13. In this case, the first 4 of the 6 bits in the false code register signify the output conductor group that is to be utilized for the transmission of the false code word. The remaining 2 bits in the false code register signify the manner in which the information that would otherwise be applied to the selected output conductor group is to be mutilated into a false code. The first 4 binary bits of the false code register are applied to a group select false code translator of the binary to 1/N type which has an output capacity of 16 since its input information comprises a 4 bit binary word. Only 13 of the 16 output terminals of this translator are utilized. Each output terminal is individual to one of the 13 groups of output conductors and each output terminal when energized selects its associated output conductor group for the generation of a false code word.

The remaining 2 bits of the false code register are applied to a "conductor select false code translator" of the binary to 1/N type. This translator has an output capacity of 4 since its input information comprises a 2 bit binary word. Only three output terminals of this translator are utilized. The first terminal, when energized, causes the conductor group specified by the first four false code bits to be inhibited so as to transmit 0/N type information. The second output terminal of the conductor select translator, when energized, specifies a first output conductor in the selected group and causes an added information bit to be applied to it, thereby transmitting 2/N information, rather than 1/N information, out over this group. The third terminal of the conductor select translator selects a second output conductor of the selected group for the transmission of 2/N type information. The outputs of the first and second false code translators are combined by means of gate circuits and applied to the 1/N output conductors coincidentally with the translated output information from the input register. The translated outputs of the two registers appearing on the output conductors simultaneously causes the information on the output conductor group specified by the first 4 false code word bits to be defective in the manner specified by the remaining 2 bits. For example, on a given false code operation, the information in the 6 bit false code register may specify that the first group of output conductors is to be utilized for the transmission of a false code word and that this word is to be of the 0/N form. Accordingly, when the contents of the two registers are translated and gated onto the output conductors, the conductors for the first group are inhibited so that no 1/N bit is applied to any conductor of the group. This causes it to transmit the specified defective 0/N type information to the receiving circuit. As another example, the information in the false code register could specify that the second conductor group is to be utilized and that an extra bit is to be added to its first conductor. This bit, when combined with another bit supplied to this conductor group from the translated output of the 20 bit register, causes 2/N type information to be generated and transmitted to the receiving circuitry.

The generation of false code information in this manner permits false code words of the 1/N type form to be generated and transmitted to remotely situated receiving circuits for the purpose of exercising their error-detecting circuits. The equipment required to generate the false code information in accordance with our invention is far less than that which would be required if the expedients utilized heretofore were to be applied to a translator controlled from a remotely situated system controller.

A feature of our invention is the provision in a register translator of a first and a second register, with the first register being adapted to store the data that is to be translated to 1/N form and with the second register being adapted to store false code data specifying the manner in which the translated 1/N data from the first register is to be rendered implausible.

A further feature is the provision in the register translator of circuitry for entering a false code word into the first register, for transferring it from the first to the second register upon the receipt of a control signal, and for then entering a data word that is to be translated into the first register while the false code word remains in the second register.

Another feature of the invention is the provision of a false code translator connected to the output of the second register for deriving output information signifying the deletion or addition of a data bit to a specified 1/N output conductor group, as well as output information signifying the output conductor group that is to be utilized for the false code word transmission.

A further feature is the provision of circuitry for combining the output of the false code translator and the translated output of the data word in the first register in order to produce an implausible false code word in the manner specified by the false code word stored in the second register.

Figure 9:
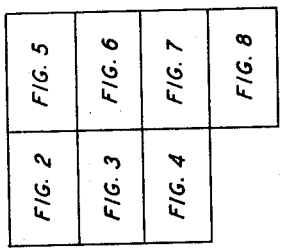

These and other objects, features, and advantages of our invention may be more readily understood when read in connection with the following description and drawings, in which:

FIG. 1 comprises a diagrammatic disclosure of a system utilizing our invention; and FIGS. 2 through 8, when arranged as shown in FIG. 9, disclose the details of an exemplary embodiment of our invention.

*General description—FIG. 1*

In FIG. 1, our invention is shown as comprising part of circuit 100 which is designated "communications bus translator" (CBT) since it may advantageously comprise a portion of a communication system in which its function is to translate the input information it receives and apply it to a communications bus 108 extending to data receivers. Two such receivers are shown on FIG. 1 and are designated "106A" and "106n". The SPC is shown on the left side of FIG. 1 as element 101 and communicates with the CBT by means of conductor groups 102 and 103.

The cooperation between the SPC, the CBT, and the data receivers is the same as that already described, namely, the SPC transmits binary commands and control signals to the CBT which registers the commands and translates them into a plurality of 1/N type information bits which, in turn, are transmitted to the data receivers. The binary commands are transmitted from the SPC to the CBT over conductors 102, the control signals which control gating and reset functions within the CBT are transmitted over conductors 103. The data receivers may be selectively enabled by unlocking pulses from the SPC so that only the selected receiver responds to information applied to bus 108. An unlocking enable pulse may be applied to data receiver 106A by the SPC over conductor 104A and to data receiver 106B over conductor 104B. By this means, the SPC may cause any selected data receiver, and only it, to respond and register the 1/N information applied to bus 108.

Each data receiver includes a check circuit, such as check circuit 107A for receiver 106A, which checks the plausibility of all received information and transmits an error signal back over conductor 105 to the SPC in the event that erroneously encoded information is detected.

In the normal operation of our system, during which times presumably good information is transmitted to the receivers, the SPC transmits binary commands over conductors 102 to the input register and control circuit 110 and, at the same time, transmits a gating pulse over conductors 103 to unlock the input register and permit it to store the binary command applied to conductors 102. The information received by register 110 is applied to the input of the output translators 111, which comprises the necessary translating equipment to convert the binary information in register 110 into a plurality of 1/N type information bits designated on FIG. 1 as 1/N1, 1/N2. . . . The output conductors of translators 111 are subdivided into groups, of which 13 are shown and are designated 112–0 through 112–12. Each group of output conductors is connected to an individual gate in the series of gates 116–0 through 116–12. Each gate has an enable input, such as for example, input conductor 121–0 for gate 116–0. The application of an enable pulse to this conductor causes the information applied to the input of the gate to be extended therethrough to its output conductors extending into bus 108. The input register and control circuit 110 applies the necessary enable pulses over conductors 120 to the gates 116– when the outputs of the translator 111 are to be transmitted to the data receivers.

The output of register 110 may be selectively applied over conductors 131 to the false code register and control circuit 113 when it is desired to generate false code words. The output of this register is extended to the group select translator 117 and to the conductor select translator 118. The outputs of these two translators are simultaneously applied to the gate circuits 119 along with that from translators 111 so that false code information of a selected type may be generated and transmitted to the data receivers.

As already mentioned, the normal operation of the circuit is such that the binary information transmitted by the SPC to the input register 110 is translated by translator 111 into a plurality of 1/N type information bits, and from there applied through gates 116–0 through 116–12 to bus 108 for transmission to the data receivers.

When it is desired to transmit false code words to a data receiver to exercise its error detectors, the SPC transmits a first binary command to register 110. This binary command comprises 6 binary bits which equals the assumed bit capacity of false code register 113. Next, the SPC transmits control signals over conductors 103 to transfer the command in register 110 over conductors 131 to false code register 113. The register 110 is then reset and the SPC transmits a binary command of the conventional bit size to register 110. In accordance with the assumptions pertaining to register bit capacity, etc., already made in preceding paragraphs, the first 4 bits in register 113 are applied to the input of group select translator 117, where they are translated into a 1/16 output indication signifying the output conductor group that is to be utilized for the generation and transmission of false code data. The output of translator 117 is applied to input 134 of gate circuits 119. The remaining 2 bits in the false code register 113 are applied over conductors 133 to the conductor select translator 118, which performs the indicated translation and transmits to input 135 of the gate circuits 119 information signifying the mode by which the information on the specified conductor group is to be mutilated. The information in register 113 may specify that erroneous information in the form of an additional bit is to be applied to the first conductor of group 112–0. In this case, the output of translator 117 signifies that the group 112–0 is to be utilized while the output of translator 118 signifies that the first conductor (the top one) is to have a bit applied to it. The gate circuits 119 receive this information and apply an output signal over conductors 115, which causes an information bit to be applied to the top conductor of the group at terminal 136–1.

At the same time, the output of translator 111 applies an information bit to another conductor of the group, such as for example, the lower one connected to terminal 136–$n1$, where $n1$ represents the number of conductors in this group. Thus, at this time, both the top and lowermost conductors of conductor group 112–0 have an information bit applied to them. The register and control circuit 110 now apply an execute pulse over cable 120 to conductor 121–0, which causes the false code word represented by the potentials on conductor group 112–0 to be extended through gate 116–0 to cable 108 and, in turn, to the data receivers. At the same time, execute signals may be applied to the other gates 116– in order to gate the 1/N information on their associated 112– conductor groups to the data receivers. The false code generated by conductor group 112–0 is received by the data receiver enabled at this time by the SPC, and in the event that its error detectors are operative, an error signal is returned over conductor 105 to the SPC, thereby signifying the current operable state of the error detector. The SPC then transmits the necessary signals over conductors 103 to reset registers 110 and 113 and restore the CBT to its normal mode of operation.

*Detailed description—FIGS. 2 through 8*

The details of a circuit embodying our invention are shown on FIGS. 2 through 8 of the drawings, when arranged as shown on FIG. 9. This circuit extensively utilizes logic elements such as AND gates, OR gates, inverting AND gates, inverting OR gates, flip-flops, translators, registers, etc. The complexity of the drawing has been reduced considerably by representing such well-known elements with symbols indicating their logical functions. Pp. 2055–2096 of the September 1964 Bell System Technical Journal contain a detailed description of the design and operation of logic circuits suitable for use in our invention. Therefore, reference is made to the aforementioned publication for a detailed description of the logic circuits shown only diagrammatically on the drawing.

An inverting OR gate is represented by the symbol 401 which comprises a half circle. The input condutor appears on the left side and the output conductor on the right side. The small semicircle on the right side tangent to the half circle signifies that the OR gate is of the inverting type. This gate operates in such a manner that its output potential is high whenever its input potential is low (ground); conversely, its output potential is low whenever its input potential is high, such as for example, +24 volts. Element 453 comprises a noninverting OR gate, and is distinguishable from the symbol for the inverting OR gate in that the small semicircle at the output is absent. Element 303 discloses the symbol utilized to represent an inverting AND gate. This symbol is distinguishable from that of the inverting OR gate in that the input conductors terminate at the line representing the diameter of the half circle. This gate operates in such a manner that its output is high whenever one or more of its inputs is low. Its output is driven low only when all of its inputs are driven high. Element 406 comprises a noninverting AND gate and is distinguishable from an inverting AND gate in that the small semicircle at the gate output is absent. This gate operates in such a manner that its output is normally high when one or more of its inputs are high. The output is driven low only when all of its inputs are low.

The multiconductor cable 452 extending into the upper input of AND gate 406 signifies that the single gate 406 shown on the drawing comprises a plurality of AND gates, the specific number of which matches the number of conductors in cable 452 which, in this case, is 21. Therefore, each conductor in cable 452 is individual to a different one of AND gates 406 and is connected to the upper input of the AND gate to which it is individual. The lower input of the 21 AND gates 406 are connected in parallel to the conductor SYNC.

Flip-flops are utilized in our circuit extensively as memory facilities for the temporary storage of data. The symbol utilized to represent a flip-flop is shown as element 301. The flip-flop has two states, termed a SET and a RESET state. It is switched to its RESET state by the application of a negative potential to the R terminal and is swiched to the SET state by the application of a negative terminal pulse to the S terminal. The 0 output terminal is associated with the RESET state and the 1 output terminal is associaed with the SET state. The potentials on these two terminals are such that the terminal associated with the current state of the flip-flop is high while the other terminal is low. The flip-flops of the type shown as element 301 may be combined to comprise a register in the conventional manner, as shown for element 404, which comprises a 21-bit input register.

The translators are shown only diagrammatically to minimize the complexity of the disclosure. Their details are well known to those skilled in the art and comprise no part of our invention.

Figure 4:
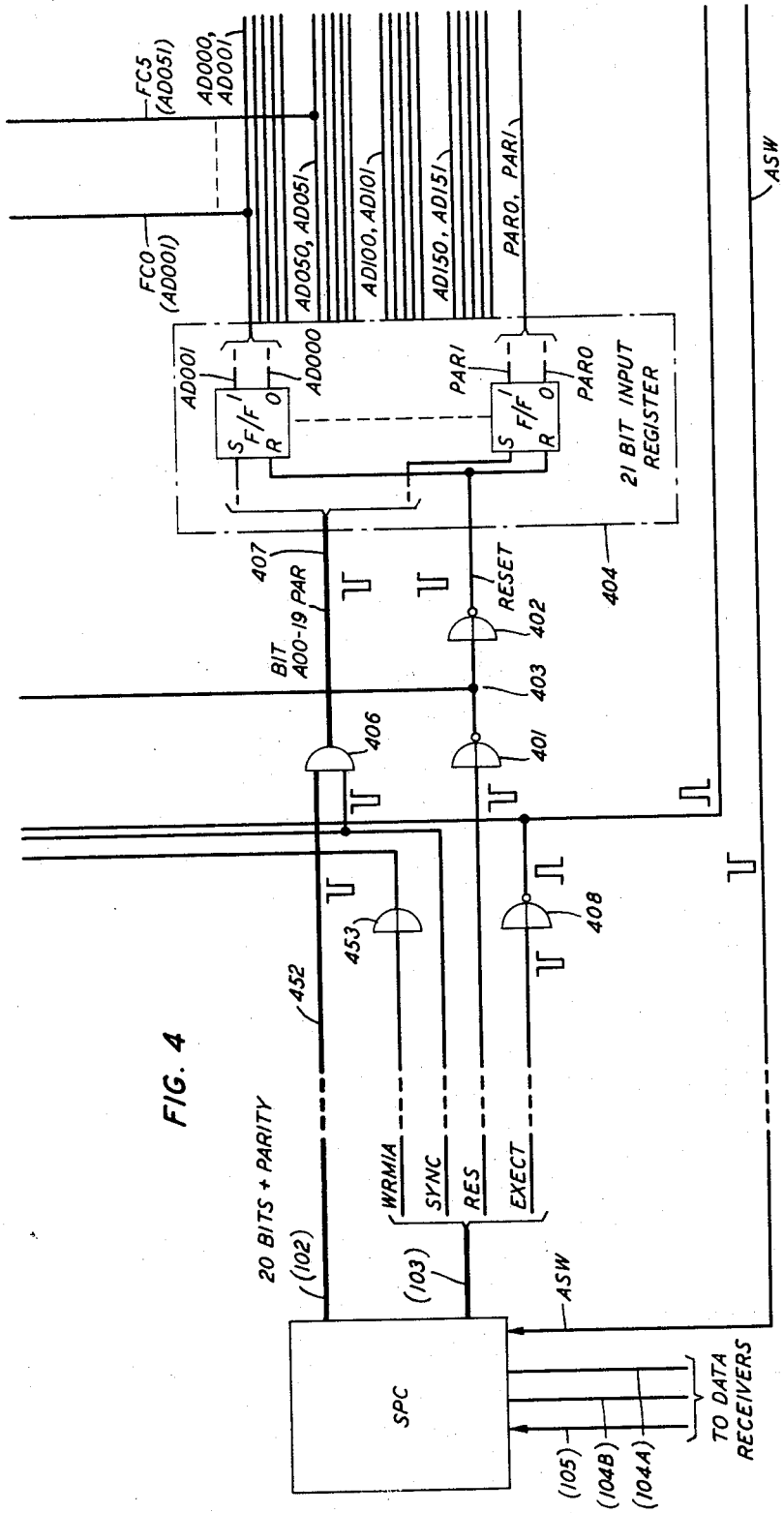
Figure 5:
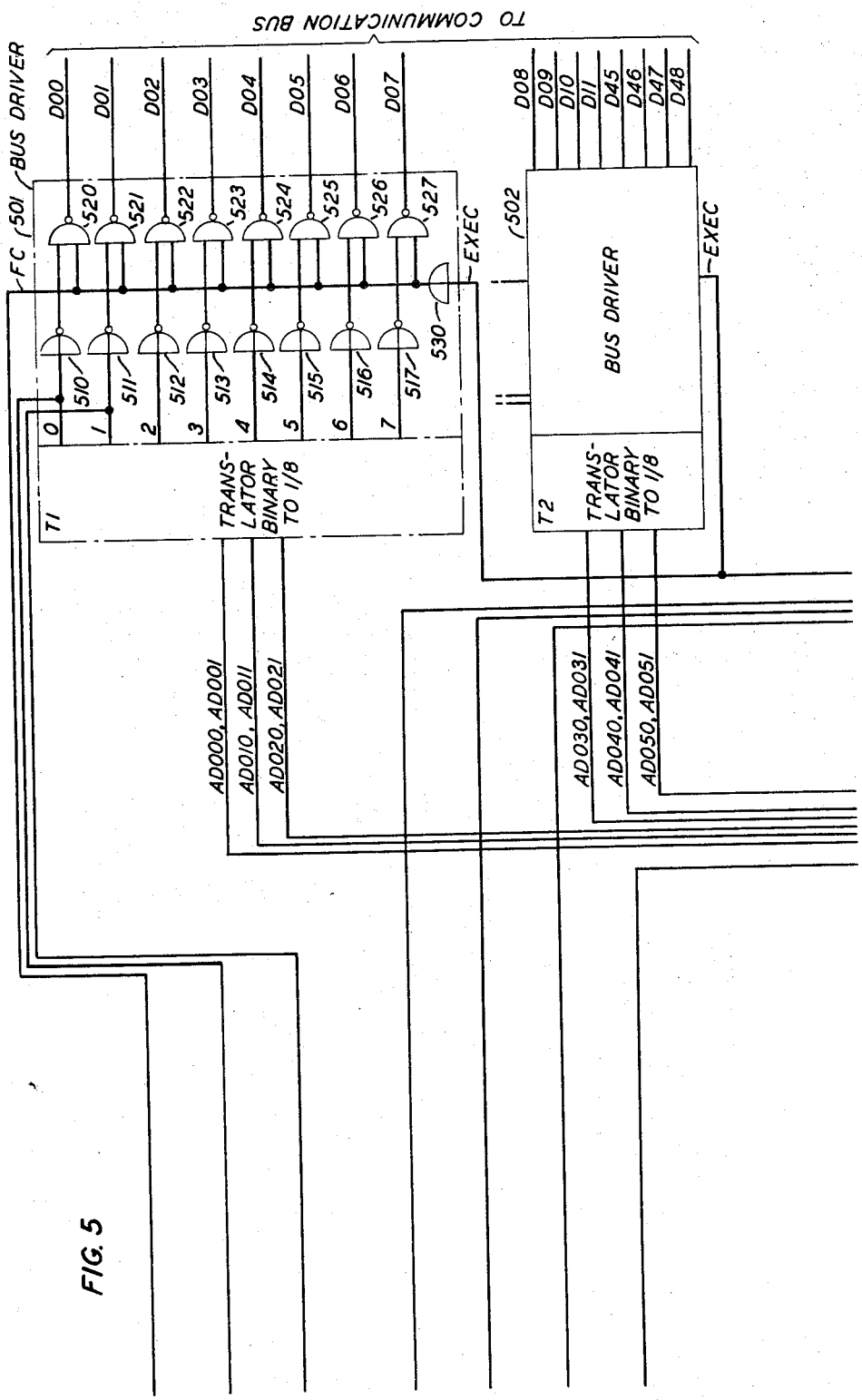
Figure 6:
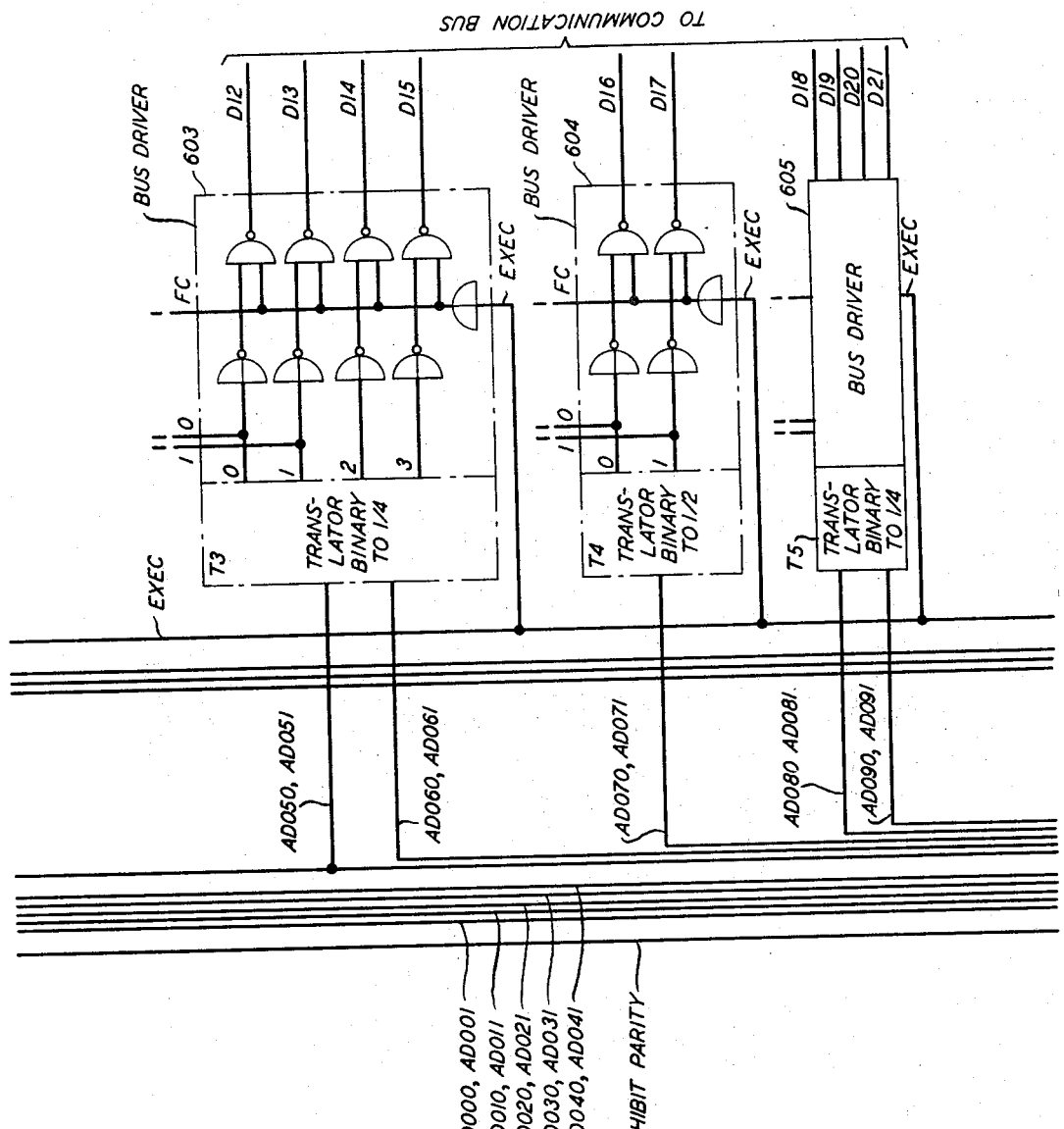
Figure 8:
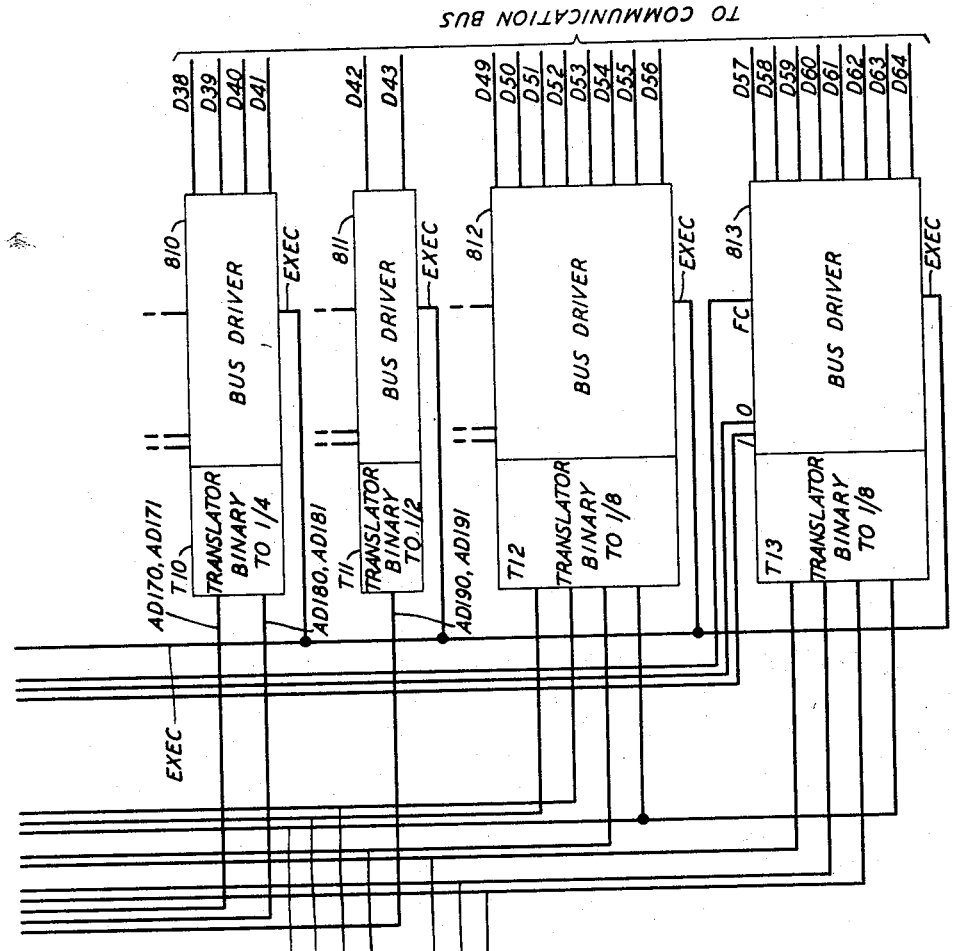

The SPC is shown on the left side of FIG. 4. The signals it transmits to our circuit are applied to the circuit elements on FIG. 4, including the various gates and the 21-bit input register 404. These signals are carried by conductors which are designated by a number enclosed within parentheses to facilitate a comparison of the corresponding conductors on FIG. 1. The register output is connected over the indicated conductors to the inputs of the translators T1 through T13 shown on the right-hand side of FIGS. 5, 6, 7 and 8. Each translator converts the binary input information it receives from its associated register order into 1/N data in the manner indicated within the rectangle representing each translator. The output of each translator is applied to a bus driver individual thereto, with the circuit of the bus driver for translator T1 on FIG. 5 being shown in detail. This bus driver is operable under control of pulses received from the circuit of FIG. 4 to gate the output of its translator to the bus conductors on the right-hand side of each figure extending to the data receivers.

Figure 2:
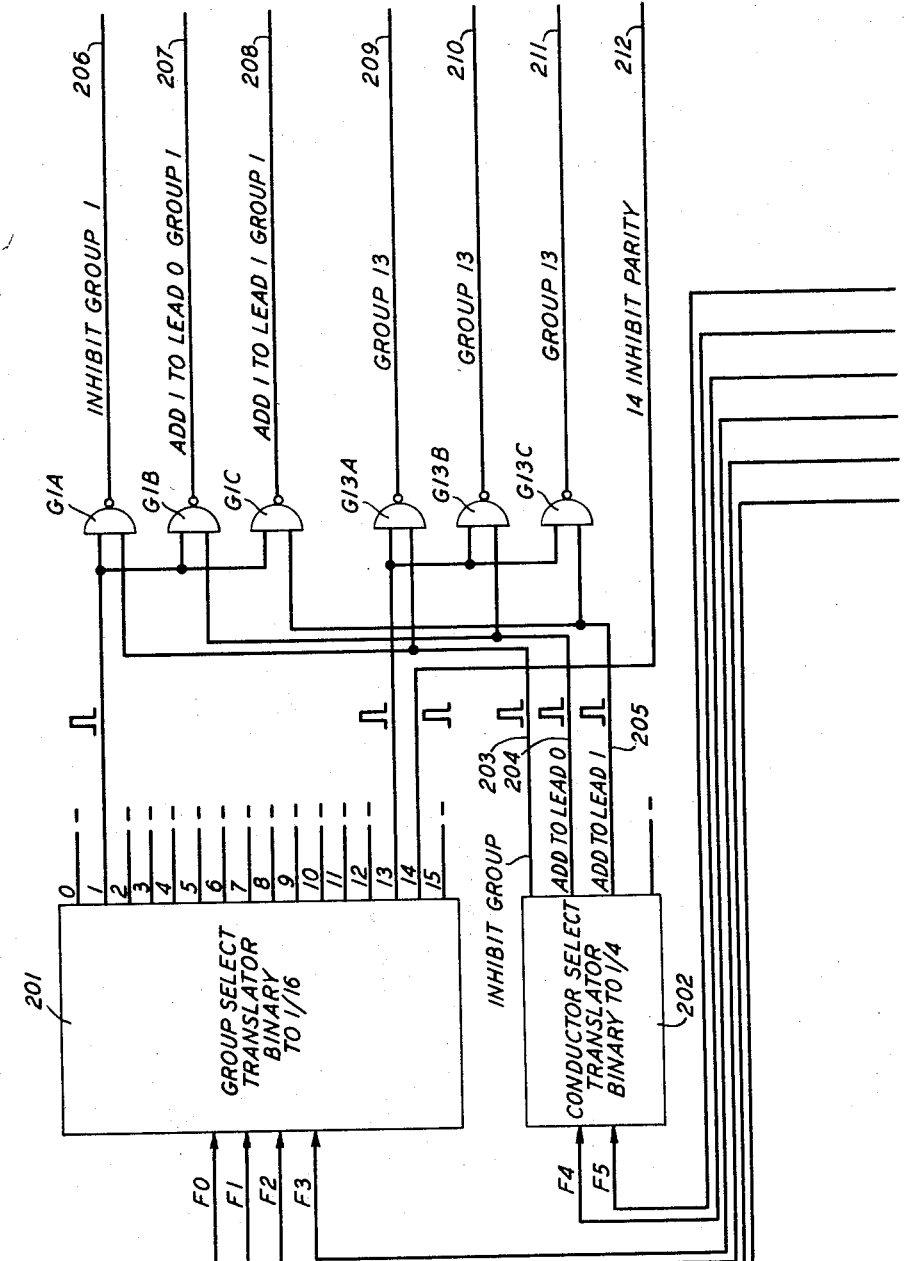
Figure 3:
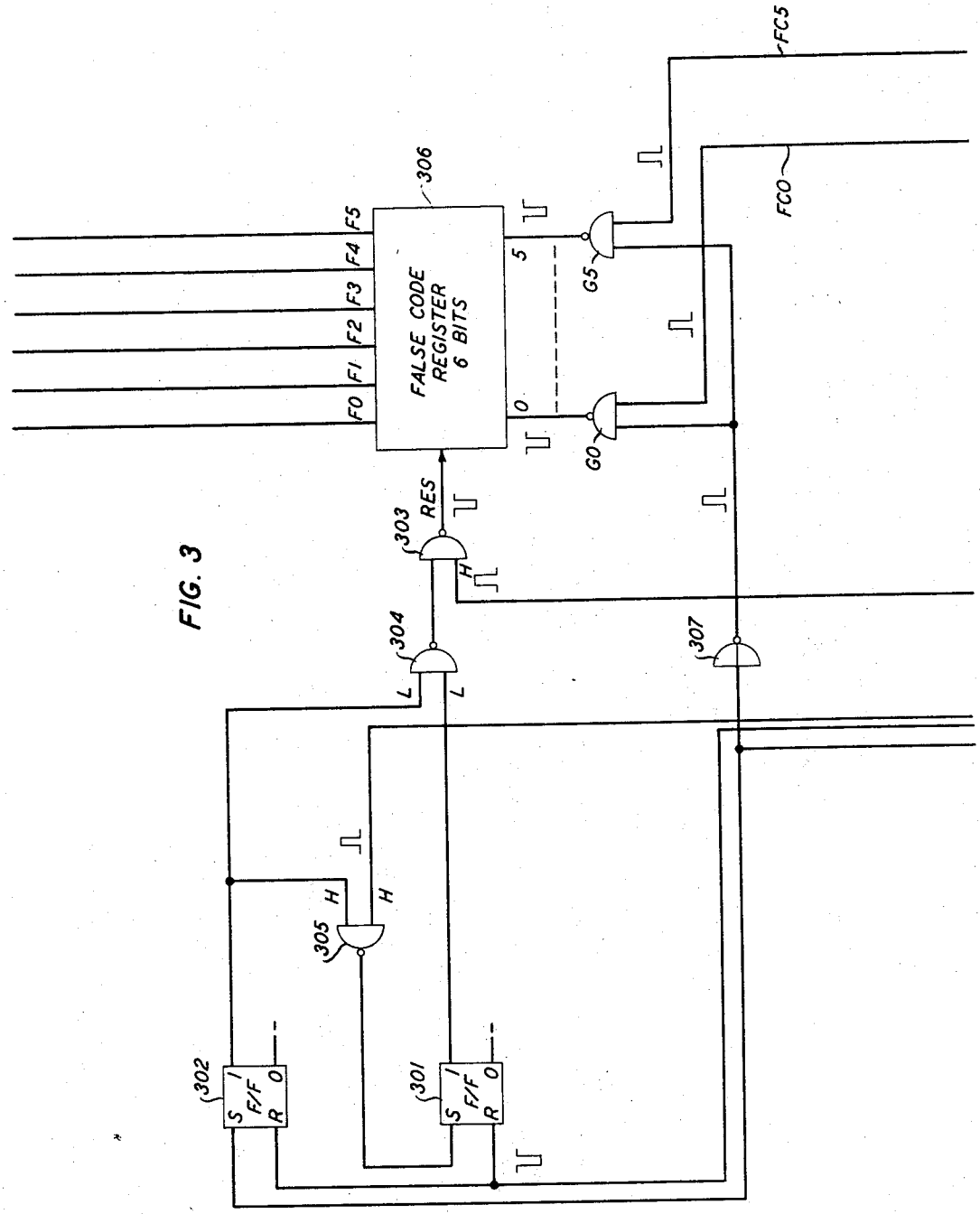

The circuitry which is primarily responsible for generating the false code information is shown on FIGS. 2 and 3. FIG. 3 comprises the 6-bit false code register and the control circuitry therefore, while FIG. 2 comprises the translators and associated gating circuitry for generating the false code information in the manner specified by the information stored in the false code register. The gating circuitry on the right side of FIG. 2 extends to each bus driver on FIGS. 5 through 8 and is effective to generate false code information of the type already described, namely, 0/N or 2/N type for the output conductor group specified by the first 4 bits within the false code register.

The binary commands that are to be translated and transmitted to the data receivers are transmitted from the SPC to the CBT in a 21-bit binary word plus an odds-1 parity bit for a total of 21 bits. These commands are transmitted over cable 452, which is also designated in a manner to indicate the information bits carried by it. The SPC also transmits control pulses to the CBT over the leads designated "SYNC," "RES," "EXECT," and "WRMI." The SPC receives information from the CBT over the lead ASW. The nature and purpose of the signals carried by these miscellaneous control leads is subsequently described in detail in the following paragraphs.

The normal operation of the SPC and the CBT is such that each transmission of a binary command is preceded by a RESET signal from the SPC over the lead RES. This RESET signal comprises a negative pulse and is transmitted through inverting OR gates 401 and 402 to apply a negative pulse to register 404 to reset it and prepare it for the reception of a binary command. The SPC next transmits a SYNC pulse to the CBT over the lead SYNC to unlock the receiving circuits of the CBT and prepare them for the reception of binary commands. The SYNC pulse is applied as a negative pulse to the lower input of the 21 noninverting AND gates 406, each of which operates in such a manner that it produces a negative pulse on its output whenever both of its inputs are driven negative. Thus, the negative SYNC pulse partially unlocks each AND gate 406 and puts the potential of the output of each AND gate under the control of the potential applied to its upper input terminal. At the same time, the SPC transmits the 21-bit binary command to the CBT over cable 452. The potentials on these leads at this time are such that a negative pulse is applied to each conductor representing a binary 1, while a positive potential remains applied to conductors representing binary bit 0. The negative-going pulses on the input leads representing binary 1 bits turn on their associated gates 406 to produce a negative pulse at their output. The outputs of the 21 AND gates 406 are applied over cable 407 to the inputs of the 21-bit register 404, where each bit is applied to the S lead of a flip-flop individual to the bit. The flip-flops associated with binary 1's are driven to their SET condition in which their 1's outputs are high while the flip-flops associated with binary 0's remain in a RESET condition in which their 0 output terminals remain high.

The output of each register order is provided on a two-conductor double-rail basis, with one conductor being connected to the 0 output terminal of its flip-flop, as shown in FIG. 4, while the other output conductor of the same flip-flop is connected to its 1 output terminal. This double railing of the output information enables both high and low output potentials to be simultaneously available from each register order. The output conductors for the 0 order are designated "AD000" and "AD001," with the first two digits of the designation representing the bit address and with the last digit representing the output terminal of its flip-flop to which the conductor is connected. Each output conductor having a final digit of "1" is high when its associated flip-flop is set. Each output conductor having a final digit of "0" is high when its associated flip-flop is reset. Thus, output conductor AD001 represents bit 00, is connected to the "1" side of its flip-flop, and is driven high whenever its flip-flop is set to store a binary 1. On the other hand, output conductor AD000, which also represents bit 00, is connected to the "0" side of its flip-flop and is driven high whenever a binary 0 is stored in the "0" order. Conversely, conductor AD001 is low for a binary 0 and conductor AD000 is low for a binary 1 in the "0" bit. The designation of the two output conductors for the parity order is different, and they are designated "P0" and "P1" to indicate directly whether they are associated with the "0" or "1" portion of their associated flip-flop. In the subsequent paragraphs, the output conductor for each register order which is connected to the "1's" output terminal of its flip-flop is referred to as the "1's" conductor, while the other conductor is referred to as the "0" conductor.

The 21 output bits of the buffer register are applied via output leads to the parity check circuit 401, which checks for an odds-1 parity and supplies a parity OK check signal to AND gate 702 if the parity checks OK. This signal manifests itself as a positive-going signal on the upper input of the AND gate.

The 20 output bits, 0 through 19, of input register 404 are applied in the manner shown to translators T1 through T13 shown on the right side of FIGS. 5 through 8. Each of these 13 translators operates on a binary to 1-out-of-N mode in response to the binary information it receives from its associated orders of register 404. The number of binary input bits each translator receives, as well as the 1/N code which it generates, may be readily ascertained from the designation of each translator. For example, the first 3 binary bits from register 404 are applied to translator T1, which is of the binary to 1/8 type. In so doing, it translates the 3-bit binary word into a 1-out-of-8 indication for each operation of register 404. Each of the remaining translators, T2 through T13, is likewise entitled in a manner signifying the 1/N code it generates. The input conductors on the left side of each translator are numbered in a manner to indicate the register order to which it is connected. Thus, translator T2 receives binary bits from orders 03, 04, and 05, of the register. These bits are received on a 2-rail basis over the conductors having the alphabetical prefix "AD." Translator T3 is of the binary to 1/4 type and receives binary information from bits 05 and 06 of the register. Translator T4 is of the binary to 1/2 type and receives input information from bit 07. Translator T5 is of the binary to 1/4 type and receives input information from bits 08 and 09. Each of the remaining translators is also of either the 1/8, 1/4, or 1/2 type, as indicated by their designation.

Each translator operates in response to the binary input information it receives and energizes one of its output conductors. The selected output conductor is driven low while the nonselected ones remain high. Each output conductor is connected to an individual inverting OR gate, the output terminal of which is connected to one terminal of an inverting AND gate individual to the inverting OR gate. For example, output conductor 0 of translator T1 is connected to the input of inverting OR gate 510, and the output of this gate is connected to the upper input of inverting AND gate 520. With this arrangement, the AND gate associated with the energized output conductor of the translator has its upper input driven high while the upper input of every other AND gate associated with the same translator remains low. The eight OR gates for translator T1 are designated 510 through 517 and the eight AND gates to which these OR gates are connected are designated 520 through 527.

The inverting OR gates connected to the output of each translator, together with the succeeding series of AND gates, comprise the "bus driver" for the translator.

The bus driver comprises the output circuit by means of which the 1/N information is applied over the communication bus to the data receivers. Thus, the series of OR gates 510 through 517 for translator T1, together with the AND gates 520 through 527 together comprise the bus driver 501 for translator T1. The output conductors extending to the data receivers from this bus driver are connected to the output of its AND gates and are designated "D00" through "D07." Each of the remaining translators, T2 through T13, also has a bus driver associated therewith which operates in the same manner as that for bus driver 501. The thirteen bus drivers on FIGS. 5 through 8 correspond to gates 116-0 through 116-12 on FIG. 1.

Each bus driver also includes a noninverting OR gate, such as OR gate 530 for bus driver 501, whose output is connected to the lower input of each of the AND gates within the bus driver. The input of this noninverting OR gate is connected to conductor EXEC. This puts the conductive condition of the AND gates of each bus driver under the joint control of conductor EXEC and the potentials supplied via the OR gates from the output conductors of its associated translator.

It may be seen from the foregoing that entry of each 21-bit word into register 404 applies binary information to the input of each translator T1 through T13 to energize with a negative potential one, and only one, output conductor of each translator. The output from each translator is not immediately applied to the output conductors of the bus driver. The reason for this is that the lower input of each AND gate in each bus driver remains low and holds its disable output high. OR gate 703 is normally in a conductive state in which its output is low. This holds the conductor EXEC low and extends a low potential through noninverting OR gate 530 to disable the AND gates 520 through 527 for translator T1 as well as the corresponding AND gates in other translators.

Subsequently when the 1/N type information is to be applied to the output bus extending to the data receivers, the SPC transmits an execute pulse to the CBT over the lead EXECT. This pulse drives the input of inverting OR gate 408 low and drives the output of the gate high, extending to the lower input of AND gate 702. The other input of this AND gate is the OK parity check signal. If the information in the input register has good parity, the parity check circuit applies a positive output pulse to the other input of AND gate 702. This permits the execute pulse to turn the AND gate on and drive its output low. The negative-going pulse on the output of gate 702 is, first of all, applied back as an all-seems-well signal to the SPC over conductor ASW. This signal signifies that the data has been entered into register 404 with good parity, together with the fact that the execute pulse has been received.

The negative output from AND gate 702 is inverted by OR gate 703 and applied as a positive pulse over conductor EXEC to each of the bus drivers 501 through 813 and, in particular, to the noninverting OR gate in each bus driver. The positive pulse on this lead unlocks the drivers and gates the output of each translator onto its AD- output conductors extending into the bus. The details of this operation may be best understood with reference to the positive EXEC pulse applied to bus driver 501. This positive pulse is extended through the noninverting OR gate 530 to one input of each of AND gates 520 through 527. The other input is currently high on only the AND gate that is associated with the energized output conductor of the translator which represents in 1/N code form the binary word applied to the input of the translator from register 404. Thus, AND gate 527 would now have both of its inputs high and would turn on to energize output conductor DO7 in the event that a binary 7 (111) was applied by register 404 to the input leads of translator T1. The turn-on of gate 527 for the duration of the execute pulse drives its output low and applies a negative pulse over conductor DO7. The remaining AND gates (520 through 526) do not turn on at this time since the upper input of each such AND gate remains low. This causes no signal to be applied over their associated output conductors to the communications bus. The operation of the bus drivers for the other translators (T2 through T13) is similar to that already described and one, and only one, output conductor in each driver is energized to apply a negative pulse to one of its D- output conductors during the reception of the execute pulse.

All data receivers connected to the bus receive all 1/N signals applied thereto by the output of the bus drivers. However, as priorly described, the SPC may cause only one data receiver to be unlocked and register this information by applying an enable pulse thereto over a conductor individually extending from the SPC to the data receiver. The selected receiver is unlocked by the reception of the enable pulse and registers the 1/N information on the bus. In the normal course of events, the data receiver transmits a signal back to the SPC, indicating that it has received and registered the information transmitted to it. This signal only indicates that information has been registered and that the information presumably is good. However, it does not ensure that the error detectors in the data receivers are currently operable. If they are not, bad information may not be detected and the data receiver would return a normal signal indicating the reception of good information.

Once the SPC is assured that information has been registered by the data receiver, it restores the CBT to a normal condition by transmitting a reset pulse to it over conductor RES. This pulse is received by inverting OR gate 406 and applied to register 404 to reset it in preparation for the reception of the next binary command.

FALSE CODE OPERATION

The preceding has described the manner in which the SPC transmits binary commands to the SPC during normal operation. The following paragraphs describe the manner in which the SPC and the CBT together cooperate to generate and transmit false code information to the data receivers to exercise their error detectors. It is assumed that the CBT has been reset by the SPC in the manner already described. The reset pulse causes a positive pulse to appear at the output of OR gate 401. This positive pulse is applied via terminal 403 to the lower input of AND gate 303. The other input of this AND gate is currently high, as subsequently described, and therefore the AND gate turns on to drive its output low as a negative reset pulse to the reset input of the 6-bit false code register 306. This resets it and clears it of any data that now might be within it.

Subsequently, the SPC transmits a SYNC pulse, together with a 6-bit binary word, to the CBT. This word is registered in the first six orders of register 404. The remaining bits of the register store binary 0's. The negative SYNC pulse is also applied to the R (reset) input terminals of flop-flops 301 and 302 to reset them in the event that they were not already reset. Next the SPC transmits a pulse to the CBT over conductor WRMI. This pulse is applied as a negative pulse to the input of noninverting OR gate 453, the output of which applies a negative-going pulse to the various portions of the control circuit of FIG. 3. This negative pulse is, first of all, transmitted to the S input of flip-flop 302 to set it and drive its 1 output high. The negative pulse from the output of gate 453 is inverted by OR gate 307 and applied as a positive pulse to one input of each of AND gates G0 through G5. This partially unlocks these AND gates and puts their conductive state solely under the control of their other input conductors which are connected to the 1's output conductors for the first 6 bits of register 404 (bits 0 through 5). The 1's output conductors for register orders storing binary 1's are now high, while the 1's output conductors for register orders storing binary 0's are low. Thus, the reception of the WRMI pulse unlocks gates G0 through 5 and gates the 6-bit word in register 404 via gates G0 through G5 into the false code register 306. This sets the false code register so that it now stores the same word stored by the first 6 bits of register 404. The termination of the WRMI pulse drives the output of OR gate 307 low and locks AND gates G0 through G5 to isolate the input of the false code register from the output of register 404.

In summary of the false code operation, so far, the false code register 306 now contains the 6-bit false code word transferred to it from input register 404. Register 404 still contains the false code word in its first 6 bits, and in its remaining bits contains binary 0's, except for a possible parity bit which may be either "0" or "1," depending upon the number of 1's in the false code word.

The SPC subsequently transmits an execute pulse to the CBT which, as already described, gates the translated output of the 21-bit register 404 onto the communications bus system. No data receiver responds at this time, since the SPC does not transmit an enable pulse to any receiver at this time. However, within the CBT, the execute pulse is applied as a positive pulse from the output of gate 408 to the lower input of AND gate 305. The other input of this AND gate is already high since the 1's output of flip-flop 302 is currently high by virtue of the flip-flop being in its SET state. Therefore, AND gate 305 turns on and applies a negative pulse from its output to the S input of flip-flop 301 to set it and drive its 1 output high into the lower input of AND gate 304. The other input of AND gate 304 is connected to the 1's output of flip-flop 302, which is already high. Therefore, both inputs of the AND gate are now high, which turns it on and drives its output low into the upper input of AND gate 303. This low potential on the input of AND gate 303 disables it and prevents it from responding to any positive reset pulse that might be applied at this time to its other input. The SPC next transmits a reset pulse to the CBT to reset register 404 in the normal manner. The false code register 306 is not reset at this time, since AND gate 303 is disabled for the reasons already mentioned.

Subsequently, the SPC transmits a SYNC pulse, together with a normal 21-bit binary word, to the CBT. This information is entered into register 404. The SYNC pulse is also extended as a negative pulse to the R (reset) terminals of flip-flops 301 and 302 to reset them. The resetting of these two flip-flops drives their 1's output low to turn off AND gate 304. This drives its output high into the upper input of AND gate 303 to unlock it and put its conductive state solely under the control of its other input conductor.

At this time, the normal 21-bit word in register 404 energizes the inputs of the translators T1 through T13 so that one, and only one, output conductor of each translator is energized at this time with a negative potential to signify the magnitude of the binary word applied to its input. However, at this time, the data in the false code register causes the circuits on FIG. 2 to supply a potential to the bus driver circuit of one of the translators so that it applies defective information to the bus.

The first 4 bits of the 6-bit false code word are applied to the output of false code register 306 to the input of translator 201 which is of the binary to 1/16 type. These 4 bits signify the bus driver selected by the SPC for false code transmission. The application of these 4 bits to the input of translator 201 energizes one of the first 13 of its 16 output conductors. The last three output conductors on the translator are not utilized in the present embodiment. Each of the first 13 output conductors is individual to one of translators T1 through T13 and the application of an output potential to one of the output conductors in response to a 4-bit binary word signifies the bus driver that is to be used for a false code transmission.

The remaining 2 bits in the false code register 306 are applied over conductors F4 and F5 to translator 202, which is of the binary to 1/4 type. These 2 bits represent the manner in which the selected bus driver is to apply a false code word to the output bus. The reception of the 2 bits energizes one of the three output conductors of the translator to signify the manner in which the false data is to be transmitted. The fourth and lowermost output conductor of the translator is not utilized in the present embodiment. The output lead 203 of translator 202 is designated "inhibit group" and, in the manner described, causes the selected bus driver to transmit 0/N type data. The output lead designated "add to lead 0" is energized by the translator when it is desired to have the 0 lead of the selected bus driver energized while another one of its output leads is also energized in order to apply 2/N type information. This causes two of its output leads to be energized and transmits 2/N type information to the bus.

Output conductors 1 through 13 of translator 201 are each connected to an individual group of three AND gates. The No. 1 output conductor of this translator is connected to one input of each of three AND gates in group 1, which are designated "G1A," "G1B," and "G1C." Similarly, the No. 13 output conductor of the translator is connected to one input of each of AND gates G13A, G13B, and G13C. The other input for each of the three AND gates within a group is connected to one of the three outputs of translator 202. With this arrangement, the energized output of translator 201 partially unlocks its associated group of three AND gates and places their conductive state under the control of the output conductors from translator 202. In other words, if output conductor 1 of translator 201 is energized, it drives the upper input high on each of AND gates G1A, G1B, and G1C. This partially unlocks these three gates and puts their conductive state solely under control of the three output conductors of translator 202. Let it be assumed at this time that the output conductor 203 of this translator is now energized with a positive potential under control of the binary data applied to the translator over conductors F4 and F5. In this case, the AND gate G1A has both of its inputs high, and it now turns on and applies a low potential to the lower input terminal of each of AND gates 520 through 521 for bus driver 501. This disables these AND gates and prevents any of them from turning on upon a subsequent reception of the positive EXECUTE pulse from the output of noninverting OR gate 530. This prevents any information bits from being applied to output conductors DO0 through DO7, and causes 0/N information to be applied to the bus by these conductors.

In a similar manner, the selection of output conductor 204, designated "add to lead 0," turns AND gate G1B on and applies a negative potential over conductor 207, designated "add 1 to lead 0 group 1" which extends to the input of OR gate 510 for bus driver 501. This turns off the OR gate, drives its output high, and drives the upper input of AND gate 520 high so that it will turn on when the EXECUTE pulse is subsequently received. At this time, the T1 translator is also energized by register 404, so that another one of its output leads, other than lead 0, is now energized. This causes the AND gate associated with this other energized lead to turn on when the EXECUTE pulse is received. The two AND gates turning on energize two of the eight output leads for this bus driver and thereby cause 2/N data to be transmitted to the data receiver via the bus.

In a similar manner, the energization of the output lead 205 of translator 202, the lead designated "add to lead 1," causes gate G1C to turn on and, consequently, causes a second 1/N bit to be applied to the output conductor D01 of bus driver 501 so that, once again, 2/N data is applied to the bus.

The preceding has described the manner in which bus driver 501 may be caused to transmit defective data. The energization of one of the other output conductors of translator 201, other than output lead 1, will unlock a different group of three AND gates. The coincidental energization of one output conductor of translator 202 will then cause the bus driver specified by translator 201 to be utilized for the transmission of false code data. It may be seen that the false code circuitry on FIGS. 2 and 3 permits false code data to be transmitted out over any one of the bus drivers, as determined by translator 201, while the precise nature of the defective data is determined by the energized output conductor of translator 202. The SPC, during idle periods of the system, routinely exercises the false code circuitry so that all of the parity detectors in the data receivers are periodically tested to ensure their proper operation. If an error detector in a selected data receiver is not properly functioning, such as for example, by being blocked so that it never returns a bad error signal to the SPC, this condition will be detected during the false code routine when the 0/N or 2/N data is transmitted to it. At this time, the SPC knows that it should receive an error signal and, if no such signal is received from the peripheral unit, the SPC will then initiate further maintenance operations to isolate and troubleshoot the defective data receiver.

In summary, the preceding description has described the operation of the CBT for both a normal and a false code routine. The normal routine is typified by sequential transmission of a RESET pulse, a SYNC pulse plus data which is entered into the input register followed by an EXECUTE pulse which gates the registered information in translated form from the output of bus drivers 501 through 813 onto the communications bus, and from there to the data receivers.

The false code routine is more involved and is initiated by the reception of a RESET pulse, which resets both the input register and the false code register. A 6-bit false code word plus a SYNC pulse is then transmitted to the CBT. This 6-bit word is entered into the input register. Subsequently, an ENABLE pulse and a WRMI pulse are received to gate the false code word from the input register to the false code register. Following this, an EXECUTE pulse is received which disables the control circuitry for the false code register so that the subsequent reception of a RESET pulse resets only the 21-bit input register and not the false code register.

Next, a normal 21-bit binary word representing good data together with a SYNC pulse are simultaneously received by the CBT from the SPC together with a SYNC pulse. This enters the 21-bit word into the input register. The setting of the register at this time energizes the input leads of the 1/N translators in the normal manner, thereby supposedly preparing them for the transmission of routine 1/N data out over the output leads of their associated bus drivers. However, the information in the false code register is effective at this time to select one of the bus drivers for data modification, as well as to select the manner in which the data is to be modified. The identification of the selected driver is represented by the first 4 bits of the false code word, while the nature of the data modification is represented by the last 2 bits. The driver selected for modification is controlled by the energized output conductor of translator 201, while the nature of the data modification is determined by the energized output conductor of translator 202. At this time, the 13 groups of gates associated with the false code circuitry of FIG. 2 are now energized in such a manner that the selected bus driver either has an additional one of its output leads energized, or alternatively, has an inhibit lead within it energized, which blocks the energization of any of its output leads.

Next, the EXECUTE pulse is received from the SPC and the nonselected bus drivers apply their customary 1/N information to the data receivers via the bus. However, the operation of the selected bus driver is modified at this time so that it transmits either 0/N or 2/N data to the bus in the manner determined by the last 2 bits of the false code word.

The disclosed arrangement, in which the output conductors D00 through D64 are subdivided into groups to transmit a plurality of 1/N type information signals simultaneously, permits the error detector for each such group in the data receiver to be tested sequentially. Thus, during a testing routine, the SPC with reference to the disclosed embodiment, could, by using the false code circuitry described, apply defective information to the 13 bus drivers in sequence in order to test the 13 error detectors associated with each of the 13 groups of conductors within a data receiver. Two successive false code words could be transmitted out over each bus driver to test the current capability of each error detector for detecting both 0/N and 2/N type information.

In the preceding description, the SPC and the data receivers have been described as being remote from the CBT. It is to be understood that the term "remote" is relative and is determined by the nature of the transmitted signals rather than by the degree of physical separation. For example, when the signals interchanged between these circuits comprise microsecond type pulses, one circuit may be remote from the other even though it is physically separated from it by only a short distance, such as for example, a few feet.

It is to be understood that the above-described arrangements are but illustrative of the application of the principles of the invention. Numerous other arrangements may be devised by those skilled in the art without departing from the spirit and scope of the invention. For example, the disclosed embodiment illustrates the manner in which 1/N type information is rendered defective by either the deletion or addition of a data bit thereto. The same expedients can be used to render implausible other types of combinational code information, such as 2-out-of-5, 2-out-of-6, 3-out-of-9, etc. data to binary coded decimal form.

What is claimed is:

1. In a system for transmitting data in combinational code form to a receiver from an output translator which receives binary data words from a system controller specifying the combinational coded data that is to be sent to said receiver, said translator comprising: means for registering binary data words received from said controller, means responsive to each registration for translating a registered data word from binary to combinational code form, means effective for transmitting said translated data to said receiver, means for coincidentally registering a binary data word together with a false code word specifying the manner in which a translated data word is to be renedered implausible, and means responsive to said coincidental registration for transmitting implausible combinational coded data to said receiver, said data receiver having an error-detecting circuit for ascertaining the plausibility of information transmitted to it.

2. The system of claim 1, in which said means for coincidentally registering comprises said means for registering binary data words, means for transferring selected orders of a registered binary data word to said false code registering means, and a false code translator connected to the output of said false code registering means for rendering implausible the translated output of a binary data word subsequently received by said binary data word registering means.

3. In combination, a first register for registering binary input information, means responsive to said registration for translating said information into combinational coded output commands, a second register for concurrently registering a binary false code word specifying the manner by which the output command generated in response to the entry of information into said first register is to be rendered implausible, an output circuit, means responsive to the entry of information only in said first register for applying a plausible coded output command to said output circuit, and means responsive to a concurrent registration in both of said registers for applying an implausible coded output command to said output circuit.

4. In combination, a first register for registering binary data words, means responsive to said registration for generating output commands comprising $X/N$ coded information where "X" is an integer greater than "0" and less than "N," means for concurrently registering a binary false code word specifying that an output command is to be generated comprising implausible $Y/N$ coded information where "Y" is an integer other than "X" and less than "N," means responsive to said last mentioned registration for converting from $X/N$ to $Y/N$ form the output command generated in response to the registration of a binary data word, a bus extending to a data receiver, and means effective for applying each output command to said bus, said receiver having check circuitry for ascertaining the plausibility of each output command.

5. The combination of claim 4 in which said first register for registering binary data words and said means responsive to said registration for generating $X/N$ type output commands comprises, a plurality of binary to $X/N$ translators, each of which is individually connected to different orders of said first register, means effective upon the registration of a binary data word for applying said registered data from the different orders of said first register individually to the inputs of said translators, each of said translators being effective upon the receipt of said data for producing at its output an indication in $X/N$ code form of the binary data received at its input.

6. The combination of claim 5 wherein said means for concurrently registering comprises, a second register, means for transferring information comprising said false code word from said first register to said second register, and means for storing a subsequently received word in said first register while said transferred information remains in said second register.

7. The combination of claim 6 wherein said means for converting comprises a group select false code translator and a conductor select false code translator, the inputs of both of said false code translators being individually connected to different orders of said second register, both of said false code translators being effective upon the entry of a false code word in said second register for controlling the conversion from $X/N$ to $Y/N$ code form of the output command generated in response to the registration of a binary data word concurrently in said first register.

8. The combination of claim 7 wherein said means for converting further comprises gate circuits connected to the outputs of said false code translators, means effective upon the entry of a false code word in said second register for applying signals from the outputs of said gate circuits onto the outputs of one of said $X/N$ translators so that implausible information is applied by it to said bus while plausible information is applied to said bus by the remaining $X/N$ translators.

9. The combination of claim 8 in which said gate circuits comprise a plurality of groups of AND gates with each group being individual to a different one of said $X/N$ translators as well as individual to a different output of said group select false code translator, means individually connecting each output of said group select false code translator to one input of all the AND gates within the group to which it is individual, means for individually connecting each output of said conductor select false code translator to an individual gate within each of said groups of AND gates, each output of said group select false code translator being effective in response to the registration of certain false code words for specifying that the output of its associated $X/N$ translator is be mutilated and rendered implausible, each output of said conductor select false code translator being effective in response to the registration of certain false code words for specifying the manner in which the output of the $X/N$ translator specified by said group select false code translator is to be mutilated, means effective upon a coincidental output from both of said group select and said conductor select false code translators for applying a signal from said gate circuits to effect the specified mutilation of the output of the specified $X/N$ translator.

10. The combination of claim 9 wherein said means for mutilating comprises, means including said gate circuits responsive to a signal from a first output of said conductor select false code translator to isolate from said bus the output of the $X/N$ translator specified by said group select false code translator in order to transmit less than $X/N$ information to said bus, means responsive to a signal on another output of said conductor select false code translator for adding an extra information bit to a specified conductor comprising the output of said specified $X/N$ translator to cause it to transmit greater than $X/N$ information to said bus, and means responsive to a signal on another output of said conductor select false code translator for transmitting greater than $X/N$ information to said bus over other output conductors of said specified $X/N$ translator.

References Cited

UNITED STATES PATENTS

| | | | |
|---|---|---|---|
| 2,945,915 | 7/1960 | Strip | 178—69 |
| 3,011,148 | 11/1961 | Sauter | 340—147 |
| 3,323,111 | 5/1967 | Waghorne | 340—172.5 |

PAUL J. HENON, *Primary Examiner.*

R. RICKERT, *Assistant Examiner.*